Jan. 15, 1963 W. OLRICH 3,072,956
FISH SCALER

Filed May 16, 1960 2 Sheets-Sheet 1

INVENTOR.
WALTER OLRICH
BY Woodling & Krost
ATTORNEYS

Jan. 15, 1963 W. OLRICH 3,072,956
FISH SCALER
Filed May 16, 1960 2 Sheets-Sheet 2

*INVENTOR.*
WALTER OLRICH
BY Woodling & Krost
ATTORNEYS

3,072,956
FISH SCALER
Walter Olrich, 4219 W. 59th St., Cleveland, Ohio
Filed May 16, 1960, Ser. No. 30,708
2 Claims. (Cl. 17—5)

The invention relates to power operated fish scalers and more particularly to one constructed of a plastic material.

An object of the invention is to provide a fish scaler which is capable of quickly and efficiently removing scales from fish.

Another object of the invention is to provide a fish scaler made of a unitary plastic construction and having a shaft extending therefrom which is readily adapted to be secured to many household drive motors for example an electric drill.

Another object of the invention is to provide a fish scaler having a plurality of scale removing teeth which extend normal to the axis of the scaler and which are separated by circumferential and axial grooves of substantially the same depth. These grooves may also be referred to as spacing wall means for separating the teeth both axially and circumferentially and are located at the same level on the periphery of the cylinder.

Another object of the invention is to provide a fish scaler having rows of teeth at either axial end thereof with a beveled outer wall which does away with the sharp corner formed by the descaling wall, top wall and side wall of a tooth.

Another object of the invention is to provide a fish scaler having teeth which include a forward descaling wall and a top wall which teeth have a curved portion at the juncture of the two to prevent a sharp edge.

Another object of the invention is to provide a fish scaler which is economical to manufacture and which is efficient and safe in operation.

Another object of the invention is to provide a fish scaler having cutting teeth which comprise first and second plane surfaces which meet together to form a cutting area and which make an angle with each other of not greater than fifty degrees. This insures the proper clearance angle of each tooth with respect to a tangent drawn to the imaginary circle formed by a rotating tooth. With this construction of plane surfaces and the angular relationship recited, the present construction prevents clogging up of the scaler while in use, which is a problem encountered by many prior art devices.

Figure 1:
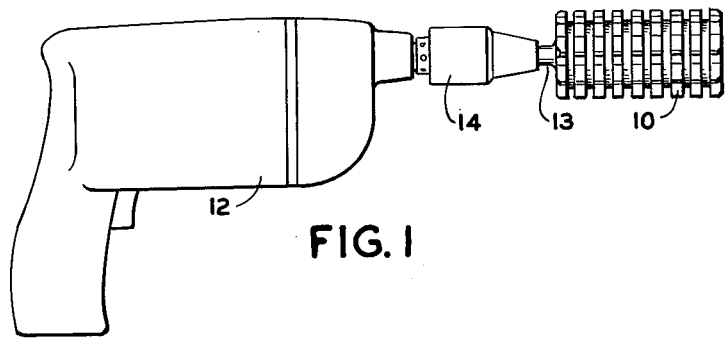
FIGURE 1 is a side elevational view of the fish scaler as adapted to be driven by an electric hand-powered drill.
Figure 2:
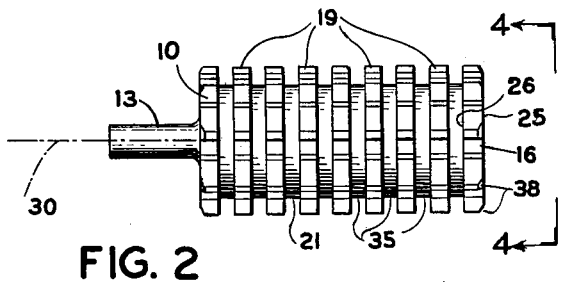
FIGURE 2 is an enlarged view of the fish scaler shown in FIGURE 1.
Figure 3:
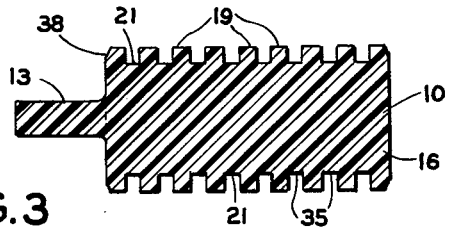
FIGURE 3 is a cross sectional view taken generally along the line 3—3 of FIGURE 4.
Figure 4:
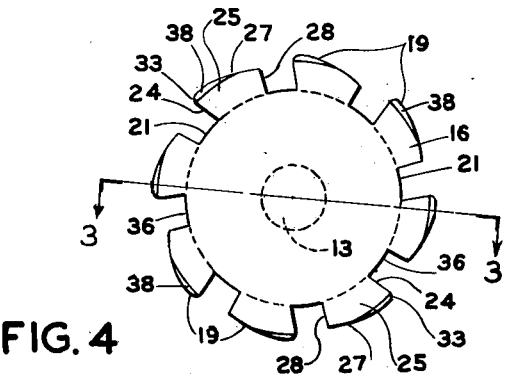
FIGURE 4 is an enlarged end view taken generally along the line 4—4 of FIGURE 2.

FIGURE 1 illustrates the fish scaler 10 of the present invention as adapted to be driven by an electric drill 12. This is accomplished by securing an axially extending shaft 13 of the fish scaler in the chuck 14 of the drill. The fish scaler 10 includes a unitary plastic construction which comprises a cylindrical member 16 along with the shaft 13 mentioned hereinabove which is integrally secured to the first or left end portion of member 16 and which extends axially therefrom. A plurality of scaling teeth 19 are integrally secured or formed on the periphery 21 of the cylindrical member 16. Each of the scaling teeth 19 is provided with a forward descaling wall 24 lying substantially in a single plane and being slanted in the direction of rotation of the cylindrical member, first and second side walls 25 and 26 respectively, a top wall 27 and a trailing wall 28. The first and second side walls extend in a direction which is normal to the axis 30 of the cylindrical member and these first and second side walls are spaced from each other. As will be noted, the teeth extend in generally circumferentially and axially aligned rows. The forward and trailing walls 24 and 28 respectively are spaced from each other to define a front cutting face and a relieved trailing edge. The forward descaling wall 24 meets the top wall 27 as seen in FIGURE 4 and is curved as at 33 to form a curved juncture. This curved juncture does away with the sharp edge which would otherwise be formed and therefore prevents possible injury to an operator of the device. As mentioned, the top wall 27 is recessed or in other words tapers towards the axis of the cylindrical member as the same extends rearwardly toward the trailing wall. The teeth of the fish scaler are distinctly separated from each other by means of a plurality of circumferentially extending grooves 35 and axially extending grooves 36. These grooves may be referred to as spacing wall means on the peripheral surface 21 of the cylindrical member and these spacing wall means axially space the side walls 25 and 26 of adjacent teeth from each other and circumferentially space the forward descaling walls from the trailing walls of adjacent teeth. It will be specifically noted that the grooves 35 and 36 are at the same level on the surface of the cylindrical member 16 and as a result the spacing wall means may be said to be at the same level on the surface of the member. The left side wall of all of the teeth on the left end as viewed in FIGURES 2 and 3 of the cylindrical member 16 and the right side wall of all of the teeth on the right end as viewed in FIGURES 2 and 3 of the member 16 have all been provided with a beveled wall 38. This beveled wall 38 cuts off the corner which would normally be formed by the top descaling of the outside side wall. It may therefore be said that the beveled wall extends into the top, descaling and a side wall of the tooth to avoid the corner formed between walls.

In operation to descale a fish with the device shown and illustrated, it is only necessary that the drill be actuated which causes the chuck and the cylindrical member to rotate. The teeth are brought into contact with the scales of the fish against the direction in which the scales lay and are removed by engagement of the descaling walls 24 with the scales of the fish. The provision of both the axially extending and circumferentially extending grooves or spacing wall means enables scales which are accumulated by the device to be forced therefrom without clogging up the teeth of the device. The provision of the curved juncture 33 and the beveled wall 38 provides a measure of safety for one operating the device in that one is less likely to be cut by the device if it comes into contact with this person. The provision of making the shaft integral with the cylindrical member 16 is advantageous in that a more effective drive connection is obtained therebetween and it is not possible for the parts to become separated and lost. It is also advantageous, in the preventing of clogging of the device, that the teeth extend generally normal to the axis of the cylindrical member and also that the groove or wall means all lie at the same level on the peripheral surface of the cylindrical member.

Figure 5:
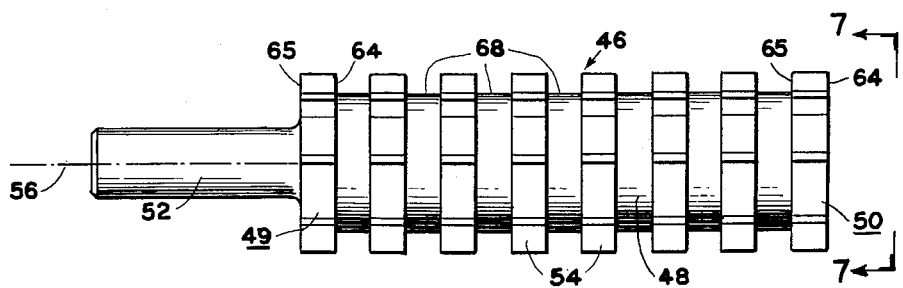
FIGURE 5 is a side elevational view of a modified form of the fish scaler of the present invention.
Figure 6:
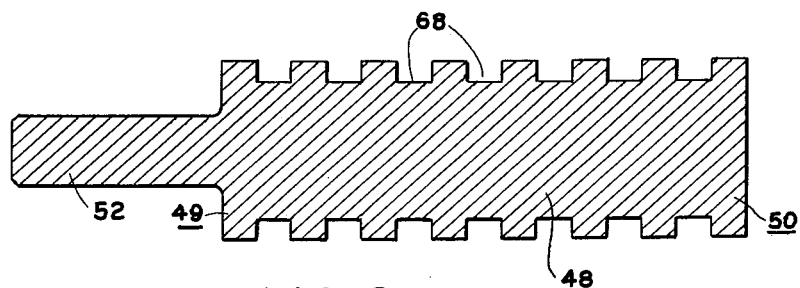
FIGURE 6 is a cross sectional view taken generally along the line 6—6 of FIGURE 7.
Figure 7:
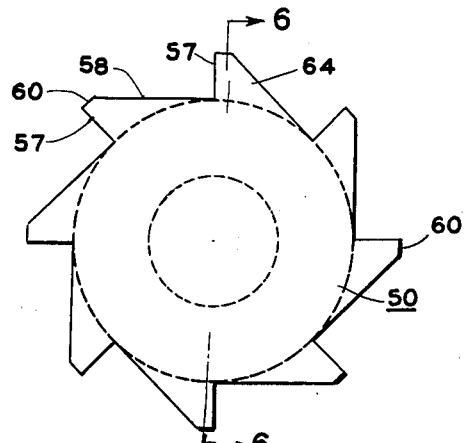
FIGURE 7 is a view taken generally along the line 7—7 of FIGURE 5.

A modified form of the fish scaler of the present invention is shown in FIGURES 5, 6, and 7. The fish scaler shown in these figures has been indicated generally by the reference numeral 46 and includes in combination a cylindrical member 48 having first and second end portions 49 and 50 respectively. The material of construction of the fish scaler 46 is metallic and is preferably of aluminum. A shaft 52 extends axially from the first end portion 49 of the cylindrical member and is integrally connected thereto since it is machined from the same material of which the cylindrical member is constructed. The axis of the fish scaler has been indicated by the dot-dash line 56. A plurality of axially spaced rows of teeth 54 are provided which are formed on the outer periphery of the cylindrical member 48. As will be noted particularly from FIGURES 5 and 7, each of the rows of teeth extend circumferentially around the cylindrical member. All of the teeth of each row are equidistantly located from the axis 56 of the cylindrical member as will best be seen in FIGURE 7 and each tooth comprises a forward wall 57 and a rearward wall 58. Since each of the teeth are constructed in the same manner and in the same way, all of the teeth have been indicated with the same reference numeral. All of the walls of the teeth comprise plane surfaces which converge and meet with each other to define a cutting area or portion 60 and the walls of each tooth make an angle with each other which is not greater than fifty degrees. This angle is preferably on the order of about thirty-seven to forty degrees and is preferably not less than ten to fifteen degrees. Utilizing a construction with the angles recited insures a substantial cutting clearance for each tooth. The cutting clearance referred to can best be understood by referring to FIGURE 7. It might be said that the rotation of the cutting portion 60 creates an imaginary circle and the cutting clearance of each tooth would be that angle formed by the rearward wall 58 of a tooth and a tangent drawn to the imaginary circle and passing through the cutting portion 60.

As will also be seen best from FIGURE 7, the rearward wall 58 of one tooth extends from the cutting area or portion 60 and meets the other or more radially inward end of a forward wall 57 of a next circumferentially adjacent tooth on the same level as the surface of the cylindrical member. Each of the teeth of each row has first and second parallel side walls 64 and 65, respectively, which extend normal to the axis 56 of the cylindrical member. The first side walls of each tooth are similar in construction and have all been identified with the same reference numeral and likewise the second side walls are similar in construction and have all been identified by the same reference numeral. The first side walls of the teeth in one cylindrical row are spaced from the second side walls of the teeth in the next adjacent cylindrical row, therefore providing a clearance space 68 between each row of teeth.

The operation and use of the device shown in FIGURES 5, 6, and 7 is substantially the same as that described in connection with the device shown in FIGURES 1 through 4. The specific construction of the device shown in FIGURES 5, 6, and 7 has proven unusually successful from the standpoint of rapid descaling of fish and this success is believed in a large measure to be due to the anti-clogging features of the device.

This application is a continuation in part application of United States Serial No. 763,022, filed September 24, 1958, now abandoned.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fish scaler including in combination a cylindrical member having first and second end portions, a shaft extending axially from said cylindrical member at only said first end portion and secured integrally thereto, a plurality of axially spaced rows of teeth integrally formed on said cylindrical member, each said row of teeth extending circumferentially around said cylindrical member, all of said teeth being equidistantly located from the axis of said cylindrical member, each said tooth comprising a forward wall and a rearward wall, said walls comprising plane surfaces converging and meeting each other at a cutting area and making an angle with each other of not greater than fifty degrees, said angle insuring a substantial cutting clearance for each said tooth, said rearward wall extending from said cutting area and meeting the other end of a forward wall of a next circumferentially adjacent tooth on the same level as the surface of said cylindrical member, each said tooth having first and second parallel sidewalls extending normal to the axis of said cylindrical member, said first sidewall of said teeth in one row being spaced from said second sidewall of said teeth in another row thereby providing a clearance space between each row of teeth.

2. A fish scaler including in combination a cylindrical member having first and second end portions, a shaft extending axially from said cylindrical member at only said first end portion and secured integrally thereto, a plurality of axially spaced rows of teeth integrally formed on said cylindrical member, each said row of teeth extending circumferentially around said cylindrical member, all of said teeth being equidistantly located from the axis of said cylindrical member, each said tooth comprising a forward wall and a rearward wall, said walls comprising plane surfaces converging and meeting each other at a cutting area and making an acute angle with each other, said angle insuring a substantial cutting clearance for each said tooth, said rearward wall extending from said cutting area and meeting the surface of said cylindrical member on the same level as the other end of a forward wall of a next circumferentially adjacent tooth, each said tooth having first and second parallel sidewalls extending normal to the axis of said cylindrical member, said first sidewall of said teeth in one row being spaced from said second sidewall of said teeth in another row thereby providing a clearance space between each row of teeth.

References Cited in the file of this patent

UNITED STATES PATENTS

| | | |
|---|---|---|
| 1,982,083 | Strand | Nov. 27, 1934 |
| 2,655,689 | Witte | Oct. 20, 1953 |
| 2,835,919 | Colburn et al. | May 27, 1958 |

FOREIGN PATENTS

| | | |
|---|---|---|
| 503,063 | Germany | July 19, 1930 |